April 22, 1952   W. E. STODDARD ET AL   2,593,809
FISHERMAN'S ICE SLED
Filed June 20, 1949   3 Sheets-Sheet 1
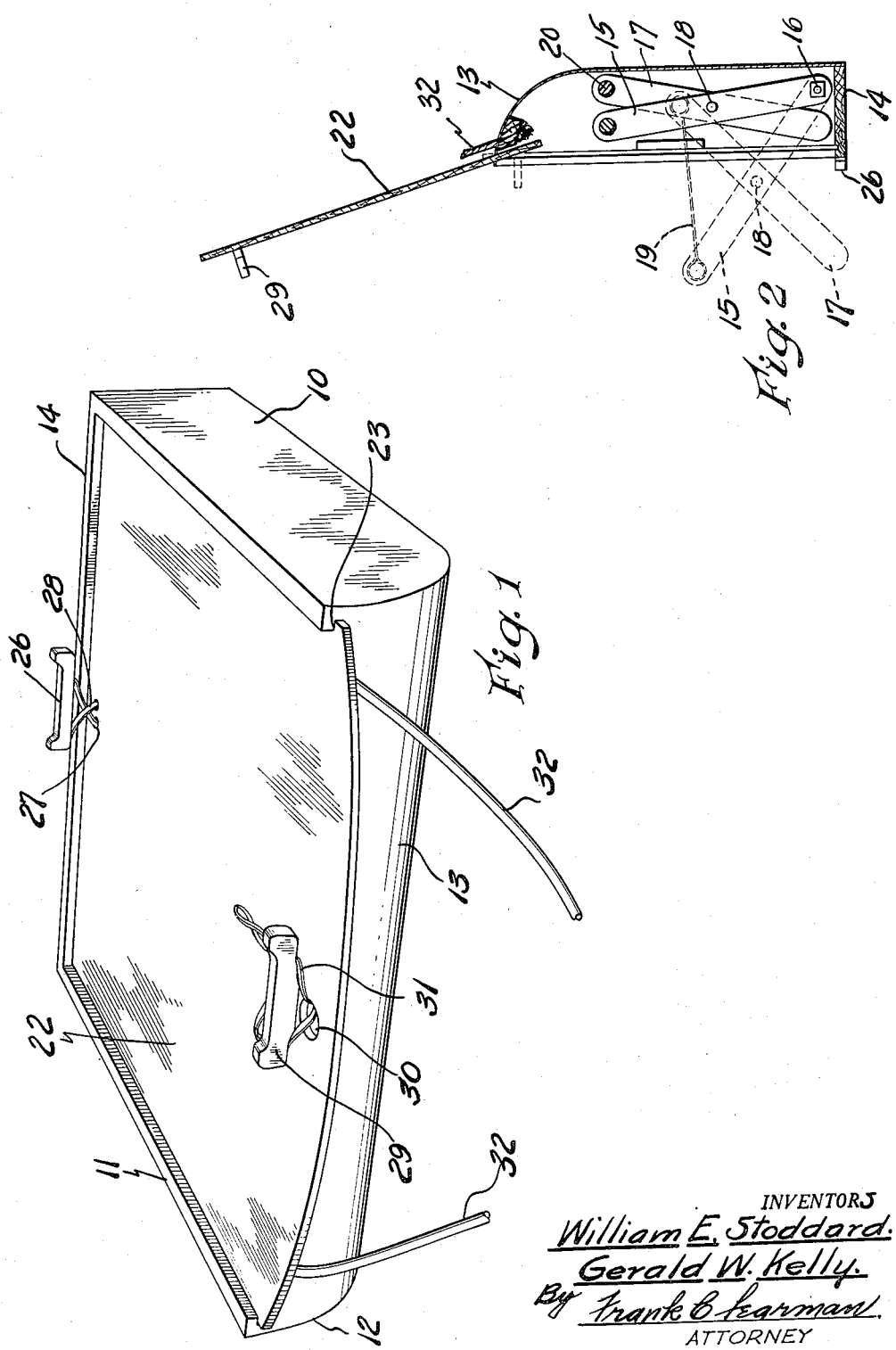
INVENTORS
William E. Stoddard.
Gerald W. Kelly.
By Frank C. Kearman.
ATTORNEY

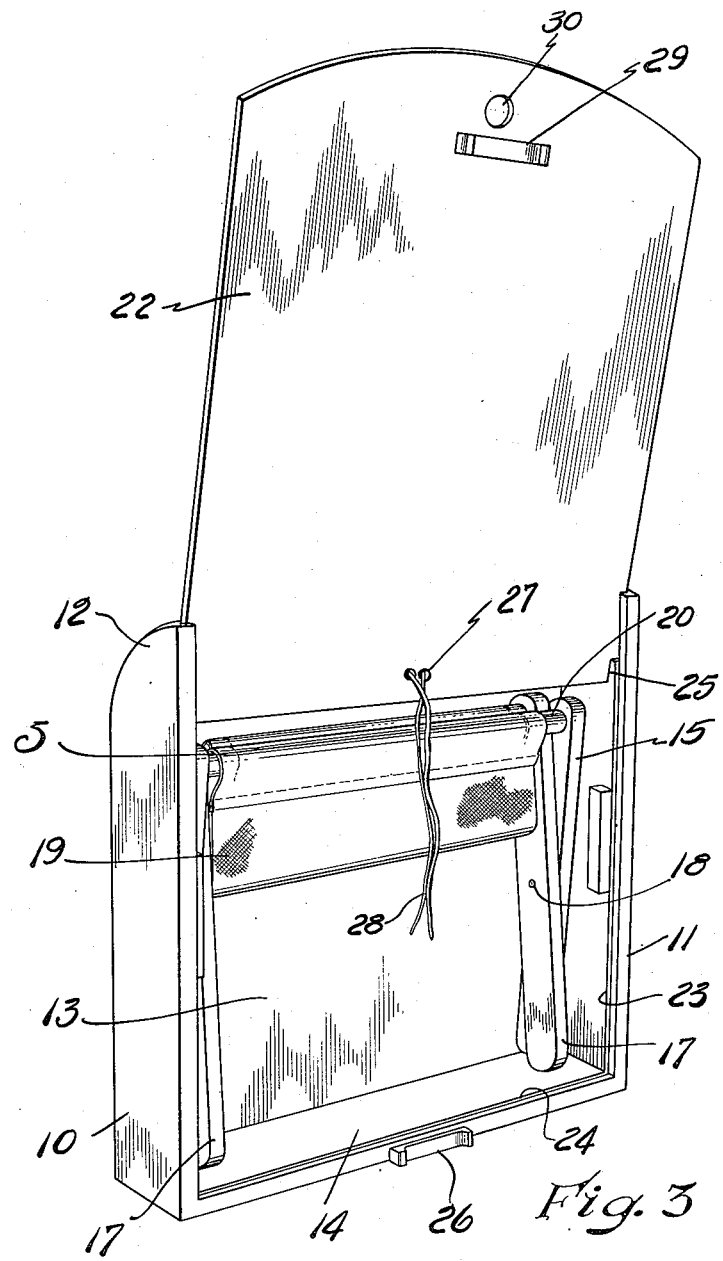

INVENTORS
William E. Stoddard
Gerald W. Kelly.
By Frank C. Fearman.
ATTORNEY

Patented Apr. 22, 1952

2,593,809

UNITED STATES PATENT OFFICE 2,593,809

FISHERMAN'S ICE SLED

William E. Stoddard and Gerald W. Kelly, Saginaw, Mich.

Application June 20, 1949, Serial No. 100,198

2 Claims. (Cl. 160—127)

This invention relates to sleds for use when fishing through ice, and more particularly to a sled which can be utilized both as a conveyance for transporting materials of any nature as well as providing a comfortable seat and shelter from the elements when set up in position on the ice.

One of the prime objects of the invention is to design a sled provided with a foldable seat which can be easily extended for use by the fisherman, and which is readily foldable into the interior of the sled so that the seat is compactly arranged and concealed from view when the sled is arranged for travel.

Another object is to provide a flat bottom sled which forms a boxlike container equipped with a slidable adjustable top panel normally forming a closure therefor when the sled is being drawn, said sled including a foldable seat and storage space to accommodate fishing equipment, fish and any other desired articles.

A further object is to provide a sled equipped with a slidably adjustable top panel which can be readily slid upwardly and there held when the sled is placed on end, thus forming a shelter and windbreak, so that the fisherman may be protected against the wind and elements when fishing.

Still a further object is to design a flat-bottom sled including a slidably adjustable top panel, and provide hinged side panels on said slidable top panel, which side panels can be swung to desired angular position with relation to the top panel to form additional protection against the elements.

A still further object is to design a flat bottom sled including a foldable stool and adjustable top panel all of which is foldable into a neat, compact structure which can be readily drawn over ice or snow, or stored or carried in the trunk of an automobile, and which when placed on end, can be easily and quickly extended to form a weather-shield, with the stool accessible to form a comfortable, substantial seat.

Still a further object is to design a flat-bottom sled which can be easily and economically manufactured and assembled, and which is extremely convenient in use.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a perspective view of our new sled showing it in folded position.

Fig. 2 is a sectional, side-elevational view, the broken lines showing the seat in extended position.

Fig. 3 is a perspective view of the sled showing the top panel extended to form a windbreak.

Figure 4:
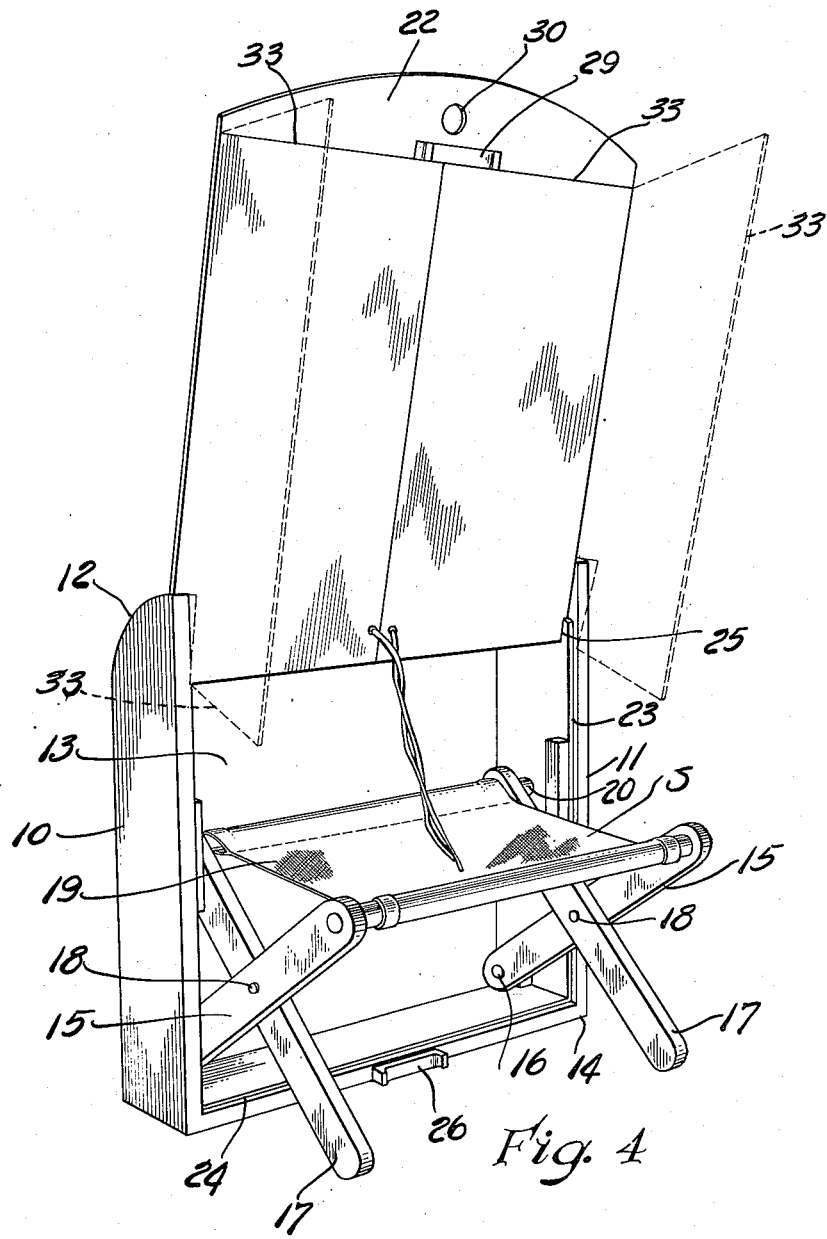
Fig. 4 is a view similar to Fig. 3 showing a slightly modified construction, and the seat in extended position.

During that period of the year when bodies of water are covered with ice, fishing through the ice is a popular sport; however, this occurs when the wind is usually strong, and the weather quite frigid; consequently, it is very advantageous to have protection against the winds, as well as a comfortable seat on which to sit, and this we have provided in our sled construction in which the numerals 10 and 11 indicate the side members of the sled structure, the front ends 12 of which are rounded as usual, and a strip of sheet metal 13 forms the bottom of the structure, a back member 14 connecting the rear ends of the side members, thus forming a box-like container in which articles of any nature can be carried.

A foldable stool structure S is mounted in this container, and comprises legs 15 and 17 hingedly connected at 18, the lower ends of the legs 15 being pivotally connected to the side members 10 and 11 at 16. Rungs 20 connect the upper ends of the pairs of legs 15 and 17 and a canvas 19 is secured to these rungs to form a flexible seat, and it will be obvious that this structure can be readily swung to folded position so that it is entirely contained within the marginal limits of the sled side members.

A top panel 22 forms a closure for the open top of the sled, and is slidably mounted in horizontally disposed grooves 23 which are provided on the inner edge of the side members 10 and 11 directly adjacent the upper edges thereof, and a similar groove 24 is provided in the rear wall 14 as shown. Angularly disposed grooves 25 open into the front ends of the grooves 23, so that when the sled is placed on end, the panel 22 can be slid upwardly so that the rear end thereof may be bottomed in the grooves 25 and held in this position, all as clearly shown in Figs. 2, 3 and 4 of the drawings, thus forming a relatively wide and effective windbreak.

A cleat 26 is provided on the end member 14, and openings 27 are provided in the panel 22, cords 28 being anchored to the panel and leading through said openings 27, so that they may be tied to the cleat 26 when the panel is in closed position. A similar cleat 29 is provided on the outer face of the panel 22, and an opening 30 is provided directly adjacent said cleat, a cord 31 being anchored to the bottom panel of the sled thence leading through the opening 30 so that it can be tied to the cleat, thus securing the panel in closed position, all as shown in Fig. 1 of the drawings, cord 31 being threaded through the opening 30 when the panel is still in partially open position.

A suitable rope or cord 32 is attached to the front end of the sled so that it can be drawn as usual. For hauling over ice or snow, the sled is folded as shown in Fig. 1, so that it can be pulled to desired location. The fisherman then unties the cords 28 and 31, places the sled on end with the flat bottom facing the wind. He then slides the panel 22 upwardly and guides the rear end of the panel into the angularly disposed short grooves 25, swings the seat to extended position as shown in Fig. 4 of the drawings, and the seat is now ready for occupancy, the bottom of the sled and panel forming an effective shield against the wind and weather.

When preparing for travel, the fisherman swings the seat to folded position, places his fish and other articles (not shown) in the sled, raises the panel 22 free of the grooves 25, and into alignment with the grooves 23, sliding it downwardly in said grooves until the outer front edge of the panel is directly adjacent the front end of the sled. He then threads the cord 31 through openings 30, and continues to slide the panel inwardly until the lower edge of the panel enters the groove 24 in the back member 14 to form a tight closure for the sled. He then secures the cords 28 and 31 to the cleats 26 and 29, and the sled is now ready for travel or for storage, and the cleats also serve for mounting or support for fish poles (not shown) or other equipment which it is desired to carry on the sled.

A pair of side panels or wings 33 can be hingedly connected to the edges of the top panel 22 if desired, and these side panels can be swung to position as indicated in broken lines in Fig. 4 of the drawings, thus more effectively protecting the fisherman from the weather, otherwise the wings are swung flat against the top panel 22.

The sled can be economically manufactured and distributed; it effectively protects the fisherman from weather; provides a comfortable and sturdy seat; and also provides ample carrying and storage space for fish or articles of any nature the fisherman may require or desire.

What we claim is:

1. A sled structure comprising spaced-apart side walls having upwardly rounded front ends, a rear wall connecting the side walls, and a bottom panel secured to the lower edges of the side and back walls respectively to form an open, box-like hollow structure, a foldable seat mounted in said structure and including pairs of pivotally connected legs, the lower end of one leg of each pair of legs being pivotally connected to the side walls of the sled, a flexible strip connecting the upper ends of the legs, said foldable seat being foldable within the marginal limits of the sled structure, connecting grooves in the upper edges of the side walls and back wall respectively, a top panel slidably mounted in said grooves and normally forming a closure for the open top of said box-like structure, angularly disposed grooves of limited length provided in the side walls adjacent the front end of said sled, and opening into the first-mentioned grooves, said angularly disposed grooves slidably accommodating the lower end of the top panel and holding it in its raised position.

2. A flat bottom sled comprising side, bottom and back members forming a hollow, box-like structure, a foldable stool hingedly mounted in said box-like structure and comprising pairs of leg members pivotally connected at a point intermediate their length, one leg of each pair of legs being pivotally connected to the inner face of each side member, a flexible member connecting the upper ends of the legs to form a seat, grooves in the inner face of the side walls and back wall respectively, a panel slidable in said grooves and forming a closure for the open top of the box-like structure, angularly disposed grooves at the front end of the side members and grooves in the side walls to accommodate said panel and secure it in extended position, and side wings hingedly connected to the edges of said top panel and foldable into facial contact with the face thereof when said panel forms the closure for the open top of the sled.

WILLIAM E. STODDARD.
GERALD W. KELLY.

REFERENCES CITED

The following references are of record in the file of this patent:

UNITED STATES PATENTS

| Number | Name | Date |
| --- | --- | --- |
| 27,189 | Lamb | Feb. 14, 1860 |
| 970,049 | Hasselberger | Sept. 13, 1910 |
| 1,338,582 | Morris et al. | Apr. 27, 1920 |
| 2,427,121 | Bohmer | Sept. 9, 1947 |
| 2,465,147 | Butler et al. | Mar. 22, 1949 |

FOREIGN PATENTS

| Number | Country | Date |
| --- | --- | --- |
| 90,388 | Sweden | Sept. 28, 1937 |